United States Patent
Hayashi (10) Patent No.: US 8,400,667 B2
(45) Date of Patent: Mar. 19, 2013

(54) IMAGE FORMING APPARATUS AND IMAGE INFORMATION SAVING METHOD

(75) Inventor: Kyoichiro Hayashi, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 873 days.

(21) Appl. No.: 12/268,785

(22) Filed: Nov. 11, 2008

(65) Prior Publication Data

US 2009/0190177 A1    Jul. 30, 2009

(30) Foreign Application Priority Data

Jan. 29, 2008   (JP) ................................ 2008-017885

(51) Int. Cl.
*G06K 15/00* (2006.01)
*G06K 9/00* (2006.01)
*H04N 1/46* (2006.01)

(52) U.S. Cl. .................. 358/1.16; 358/537; 382/167

(58) Field of Classification Search ................ 358/1.16, 358/537, 538, 527, 530, 1.15; 382/167, 309
See application file for complete search history.

(56) References Cited

U.S. PATENT DOCUMENTS

| | | | | |
|---|---|---|---|---|
| 6,078,936 A * | 6/2000 | Martin et al. .................. | 715/201 |
| 6,198,553 B1 * | 3/2001 | Yamamoto et al. ............ | 358/520 |
| 6,281,983 B1 * | 8/2001 | Takahashi et al. ............. | 358/1.2 |
| 6,343,147 B2 * | 1/2002 | Yamamoto .................... | 382/167 |
| 6,470,101 B1 * | 10/2002 | Nakamura .................... | 382/319 |
| 7,034,965 B2 * | 4/2006 | Cheng .......................... | 358/453 |
| 7,164,486 B1 * | 1/2007 | Nakamura et al. ........... | 358/1.15 |
| 7,292,369 B2 * | 11/2007 | Yokoyama et al. ............ | 358/1.9 |
| 7,515,313 B2 * | 4/2009 | Cheng .......................... | 358/474 |
| 7,535,591 B2 * | 5/2009 | Kujirai ......................... | 358/1.16 |
| 7,538,908 B2 * | 5/2009 | Nakabayashi et al. ........ | 358/1.9 |
| 7,548,238 B2 * | 6/2009 | Berteig et al. ................ | 345/426 |
| 7,567,360 B2 * | 7/2009 | Takahashi et al. ........... | 358/1.15 |
| 7,760,377 B2 * | 7/2010 | Hirabayashi ................. | 358/1.15 |
| 8,310,705 B2 * | 11/2012 | Ogino et al. ................. | 358/1.15 |
| 2001/0014174 A1 * | 8/2001 | Yamamoto .................... | 382/167 |
| 2002/0048413 A1 * | 4/2002 | Kusunoki ...................... | 382/282 |
| 2002/0097436 A1 * | 7/2002 | Yokoyama et al. ............ | 358/2.1 |
| 2003/0197894 A1 * | 10/2003 | Miyamoto et al. ........... | 358/1.18 |
| 2004/0130744 A1 * | 7/2004 | Wu et al. ...................... | 358/1.15 |
| 2005/0053280 A1 * | 3/2005 | Nishikawa .................... | 382/167 |
| 2006/0285140 A1 * | 12/2006 | Ehara ............................ | 358/1.13 |
| 2007/0139707 A1 * | 6/2007 | Takami et al. ................ | 358/1.15 |
| 2007/0146791 A1 * | 6/2007 | Murase ......................... | 358/1.16 |
| 2007/0291292 A1 * | 12/2007 | Nakabayashi et al. ........ | 358/1.9 |

(Continued)

FOREIGN PATENT DOCUMENTS

JP    2003-219082 A    7/2003
JP    2004-128837 A    4/2004

(Continued)

*Primary Examiner* — Madelein A Nguyen
(74) *Attorney, Agent, or Firm* — Fitch, Even, Tabin & Flannery, LLP (57) ABSTRACT

An image forming apparatus according to one embodiment of the present invention comprises an image reading unit that reads an image from a document to generate base image data which matches predetermined default reading conditions; a reading condition identifying unit that identifies reading condition settings specified by a user in response to when the image is read; and an information saving unit that saves the base image data and the reading condition settings identified by the reading condition identifying unit in association with each other as saved-image information.

8 Claims, 5 Drawing Sheets

U.S. PATENT DOCUMENTS

| | | | |
|---|---|---|---|
| 2007/0297022 A1* | 12/2007 | Nakatsuka | 358/474 |
| 2008/0013112 A1* | 1/2008 | Yokoyama et al. | 358/1.2 |
| 2008/0030818 A1* | 2/2008 | Nagahara et al. | 358/537 |
| 2008/0231914 A1* | 9/2008 | Motoyoshi | 358/474 |
| 2008/0256476 A1* | 10/2008 | Seo et al. | 715/772 |
| 2009/0303524 A1* | 12/2009 | Kanekawa et al. | 358/1.15 |
| 2011/0122443 A1* | 5/2011 | Otsuka et al. | 358/1.15 |
| 2012/0250061 A1* | 10/2012 | Takami et al. | 358/1.13 |

FOREIGN PATENT DOCUMENTS

| | | |
|---|---|---|
| JP | 2005-229481 A | 8/2005 |
| JP | 2006-148449 A | 6/2006 |
| JP | 2006-202197 | 8/2006 |

* cited by examiner

Fig. 5

# IMAGE FORMING APPARATUS AND IMAGE INFORMATION SAVING METHOD

INCORPORATION BY REFERENCE

This application is based upon and claims the benefit of priority from the corresponding Japanese Patent Application No. 2008-017885, filed Jan. 29, 2008, the entire contents of which is incorporated herein by reference.

FIELD OF THE INVENTION

The present invention relates to an image forming apparatus and an image information saving method.

BACKGROUND OF THE INVENTION

Some multi-function peripherals have a box function which is capable of saving image data obtained by reading an image from a document, in a document box in a hard disk drive, etc., and later on reading out the image data from the document box to, for example, print the document.

In such a box function, image data that matches reading conditions set by a user when an image is read is generated and the image data is saved in a document box. Then, the image data saved in the document box is used as it is upon outputting such as document printing.

Upon outputting in such a manner as document printing, condition settings can also be set by the user. In such a case, when output conditions which are set by the user when image data is outputted from the document box differ from reading conditions, the image data saved in the document box is automatically edited to match the output conditions and then outputted.

Hence, in many cases, two edits (a first edit for allowing image data to match reading conditions applied when the image data is saved in the document box and a second edit for allowing the image data to match output conditions applied when the image data is outputted from the document box) are performed on the image data. This multiplicity of edits, in turn, can unfortunately lead to degradation of the printed image.

SUMMARY OF THE INVENTION

An object of the present invention is therefore to provide an image forming apparatus and an image information saving method that are capable of reducing image degradation caused by a repetition of edits when the box function is used.

An image forming apparatus according to one embodiment of the present invention comprises an image reading unit that reads an image from a document to generate base image data which matches predetermined default reading conditions; a reading condition identifying unit that identifies reading condition settings specified by a user in response to when the image is read; and an information saving unit that saves the base image data and the reading condition settings identified by the reading condition identifying unit in association with each other as saved-image information.

These and other objects, features and advantages of the present invention will become more apparent from the following detailed description of the present invention when taken in conjunction with the accompanying drawings.

Skilled artisans will appreciate that well-understood elements that are useful or necessary in a commercially feasible embodiment are not necessarily depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

In this text, the terms "comprising", "comprise", "comprises" and other forms of "comprise" can have the meaning ascribed to these terms in U.S. Patent Law and can mean "including", "include", "includes" and other forms of "include".

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION

An embodiment of the present invention will be described below with reference to the drawings.

Figure 1:
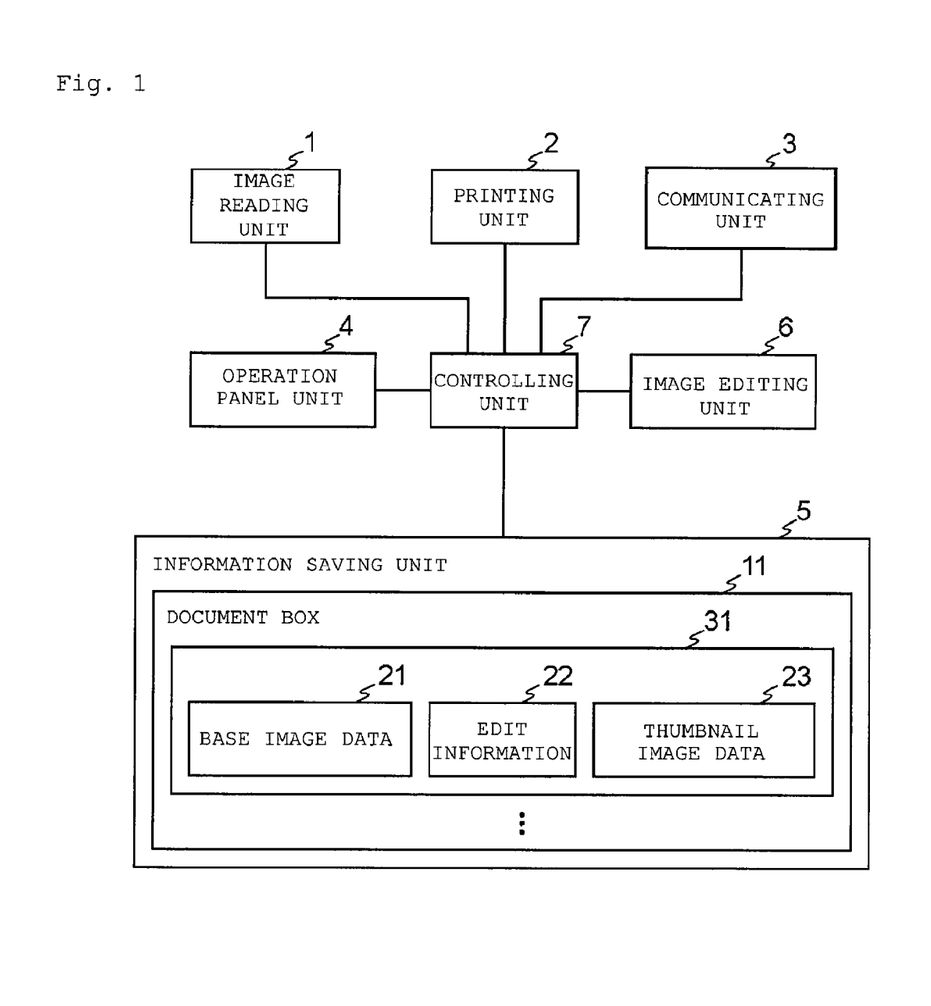
FIG. 1 shows a block diagram showing a configuration of an image forming apparatus according to an embodiment of the present invention.

FIG. 1 is a block diagram showing a configuration of an image forming apparatus according to an embodiment of the present invention. In FIG. 1, an image reading unit 1 is a device that irradiates light onto one side or both sides of a document fed by an automatic document feeding device or a document placed by a user and receives reflected light therefrom, etc., to read an image of the document and outputs the image as image data.

A printing unit 2 is a device that prints document images based on image data generated by the image reading unit 1 and image data saved in a document box 11.

A communicating unit 3 is a device that transmits image data through a telephone line, or a computer network, etc. The communicating unit 3 has a network interface card and a modem, for example.

An operation panel unit 4 is a device that includes a display device and an input device, which are not shown, and implements a user interface. For the display device, for example, a display such as a liquid crystal display is used. For the input device, for example, key switches and a transparent touch panel disposed on a screen of the display device are used. For example, an image of an operation button is displayed by the display device and an operation performed on the operation button is detected by the touch panel. By the input device of the operation panel unit 4, a reading condition setting operation performed by an end user when an image is read is detected.

An information saving unit 5 is a device that saves, for example, image data generated by the image reading unit 1. In the information saving unit 5, a saving area is reserved as the document box 11 and image data is saved in the document box 11. For the information saving unit 5, a device, such as a hard disk drive, that drives a readable/writable recording medium is used.

The information saving unit 5 saves base image data 21, edit information 22, and thumbnail image data 23 which are generated by a box saving function, as one set of saved-image information.

The base image data 21 is image data generated by the image reading unit 1 and matching default reading conditions. The default reading conditions indicate a combination of default values of, for example, a color setting, a resolution setting, and an image quality setting. Specifically, for example, the default value of the color setting is "color", the default value of the resolution setting is 600 dpi (dots per inch), and the default value of the image quality setting is "high".

The edit information 22 indicates reading condition settings specified by the user when an image is read. The reading condition settings indicate a combination of, for example, a color setting, a resolution setting, and an image quality setting which are specified by the user.

Thumbnail image data 23 is image data generated by applying the edit information 22 to the base image data 21 and scaling down the base image data 21 to a predetermined low resolution.

An image editing unit 6 is a processing unit that generates new image data by changing, for example, the number of colors, resolution, image quality, or data format of image data. The image editing unit 6 generates the thumbnail image data 23, preview image data, and output image data, etc., from the base image data 21.

A controlling unit 7 is a processing unit that controls the image reading unit 1, the printing unit 2, the communicating unit 3, the operation panel unit 4, the information saving unit 5, and the image editing unit 6, according to, for example, a user operation performed on the input device of the operation panel unit 4. The controlling unit 7 has a reading condition identifying unit that identifies reading condition settings based on a setting operation detected by the input device of the operation panel unit 4 when a document is read. Also, the controlling unit 7 has an output condition identifying unit that identifies output condition settings based on a setting operation detected by the input device of the operation panel unit 4 when the base image data 21 is outputted. Also, the controlling unit 7 has an edit content determining unit that determines edit contents for generating output image data from the base image data 21, based on reading condition settings associated with the base image data 21 which is an output target, and output condition settings.

Note that the image editing unit 6 and the controlling unit 7 are implemented by, for example, a computer or DSP (digital signal processor) which executes a computer program. In this case, the program is provided by a computer-readable recording medium such as a Read Only Memory (ROM), a hard disk, a flexible disk, a memory card, or a magneto-optical disk, etc. Then, by the program being read into the image forming apparatus from the recording medium, instructions are sent to each component unit from the controlling unit 7 to cause each component unit to perform a process.

Now, the operation of the above apparatus will be described.

Figure 2:
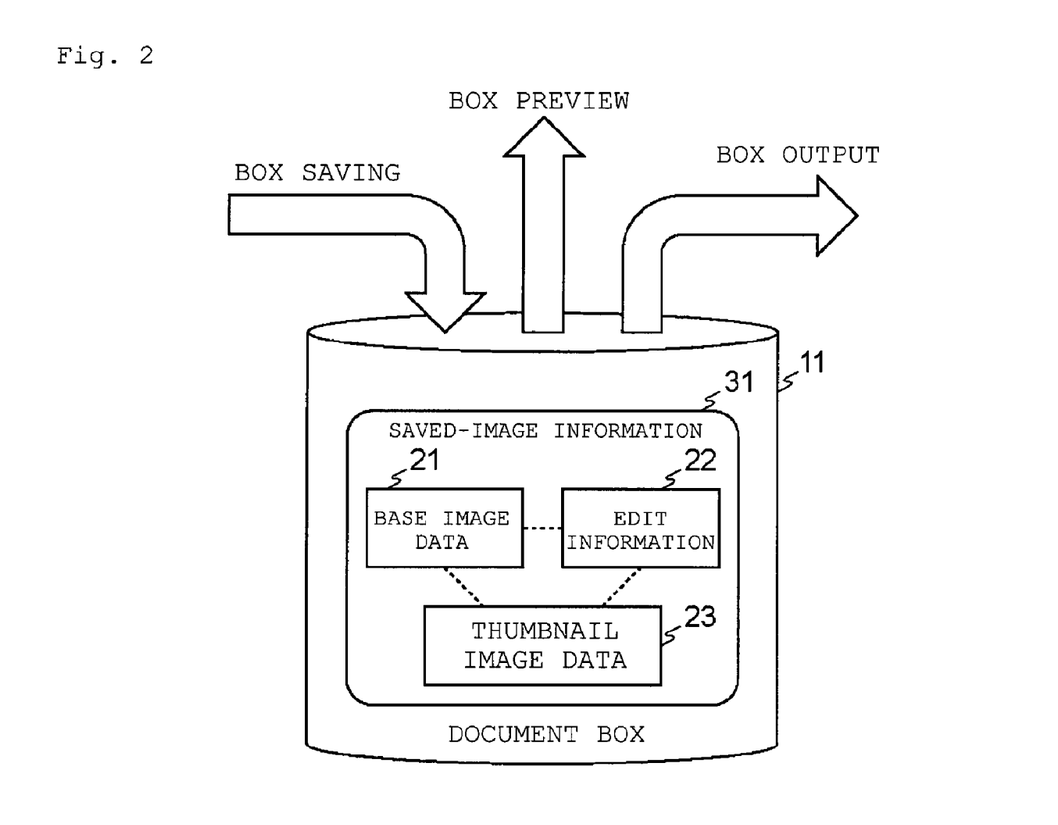
FIG. 2 shows a diagram showing various processes associated with a box function, which are performed by the image forming apparatus shown in FIG. 1.

FIG. 2 is a diagram showing various processes associated with the box function, which are performed by the image forming apparatus shown in FIG. 1. The box function mainly performs three processes: (1) box saving; (2) box preview; and (3) box output.

Each process will be described below.

(1) Box Saving

The box saving is the process of saving an image read by the image reading unit 1 together with reading condition settings specified by the user, in the document box 11 as saved-image information 31. When the box saving is selected by a user operation performed on the operation panel unit 4, a box saving process is performed.

Figure 3:
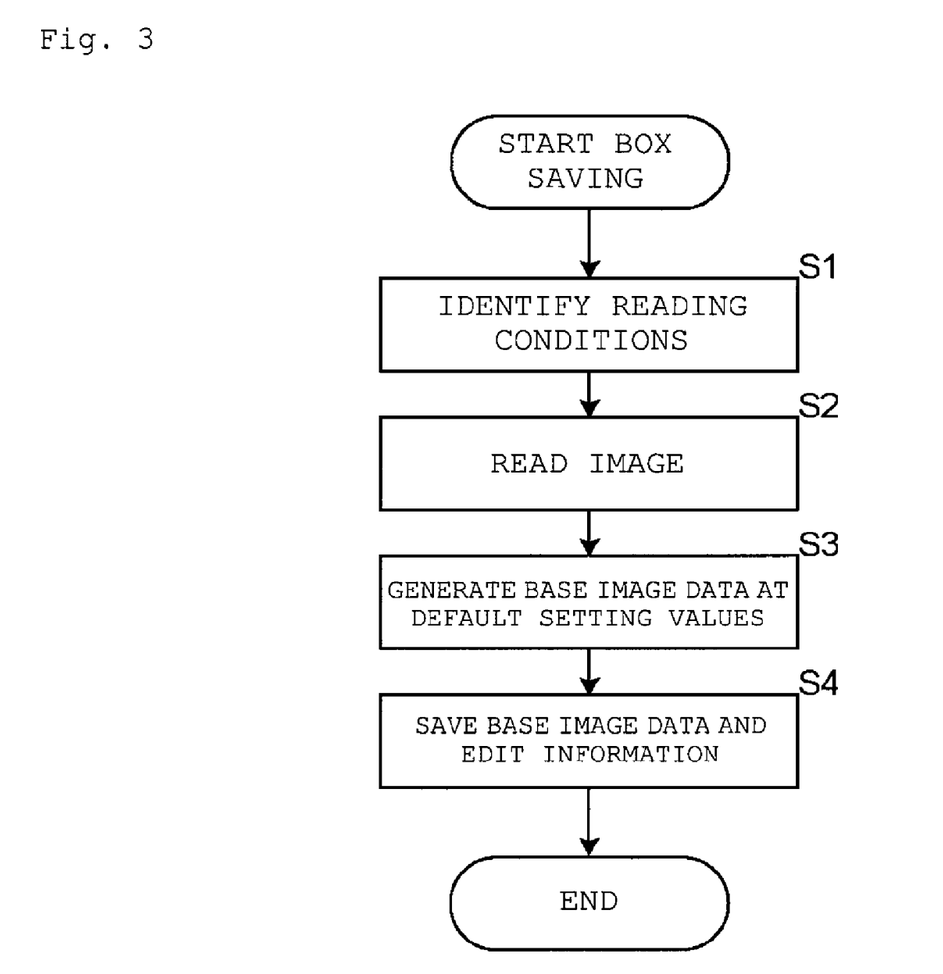
FIG. 3 shows a flowchart describing a box saving process performed by the image forming apparatus shown in FIG. 1.

FIG. 3 is a flowchart describing a box saving process performed by the image forming apparatus shown in FIG. 1. With reference to FIG. 3, the box saving process will be described below.

In the box saving process, first, reading conditions are specified by the user. The reading conditions include conditions such as color, resolution, and image quality. For example, a list of choices for each condition item is displayed on the display device of the operation panel unit 4 and from among the choices the user selects a desired value by operating the input device of the operation panel unit 4. This selection operation is detected by the operation panel unit 4 and notified to the controlling unit 7. Then, the controlling unit 7 identifies reading condition settings specified by the user, based on the selection operation (step S1). The reading condition settings are temporarily stored in a RAM (not shown), etc., as edit information 22.

After the reading conditions are specified by the user, an operation for reading an image is performed on the operation panel unit 4. This operation is detected by the input device of the operation panel unit 4 and notified to the controlling unit 7. In response to the operation, the controlling unit 7 controls the image reading unit 1 to read an image of a document (step S2). By this, the image reading unit 1 reads the image of the document to generate base image data 21 in default reading conditions (step S3). The base image data 21 is temporarily stored in the RAM (not shown), etc.

Then, the controlling unit 7 generates thumbnail image data 23 from the base image data 21 and the edit information 22 and saves the base image data 21, the edit information 22, and the thumbnail image data 23, as one set of saved-image information 31, in a document box 11 specified by the user (step S4).

Namely, in the box saving in the present embodiment, image data (i.e., base image data 21) in which reading conditions specified by the user are not reflected is associated with reading conditions (i.e., edit information 22) specified by the user and the image data and the reading conditions are saved in the document box 11 as one piece of saved-image information 31. By this, a read image intended by the user is saved as one piece of saved-image information 31.

(2) Box Preview

The box preview is the process of generating preview image data from saved-image information 31 in the document box 11 and displaying an image based on the preview image data. When the box preview is selected by a user operation performed on the operation panel unit 4, a box preview process is performed.

Figure 4:
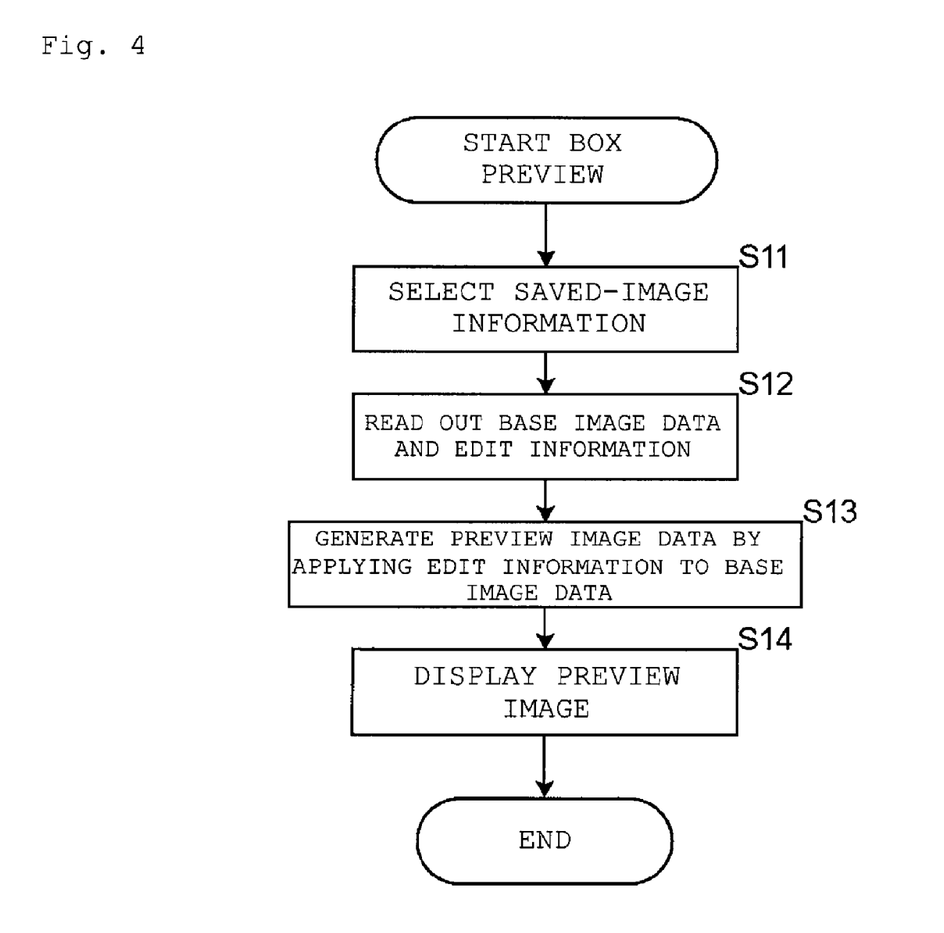
FIG. 4 shows a flowchart describing a box preview process performed by the image forming apparatus shown in FIG. 1.

FIG. 4 is a flowchart describing a box preview process performed by the image forming apparatus shown in FIG. 1. With reference to FIG. 4, the box preview process will be described below.

In the box preview, first, a list of pieces of saved-image information 31 in the document box 11 is displayed on the operation panel unit 4 and a piece of saved-image information 31 which is a preview target is selected by a user operation performed on the operation panel unit 4. At that time, as a piece of saved-image information 31 in the list, a thumbnail image based on thumbnail image data 23, and edit information 22, etc., are displayed. The selection operation performed by the user is detected by the operation panel unit 4 and notified to the controlling unit 7. Then, the controlling unit 7 identifies a piece of saved-image information 31 which is the preview target, based on the selection operation (step S11).

When the preview target is identified, the controlling unit 7 reads out base image data 21 and edit information 22 of the saved-image information 31 from the document box 11 (step S12). The base image data 21 and the edit information 22 are temporarily stored in the RAM (not shown), etc.

Then, the controlling unit 7 causes the image editing unit 6 to generate preview image data (step S13). The image editing unit 6 generates preview image data at a predetermined resolution by applying the edit information 22 to the base image data 21. For example, when the color setting of the base image data 21 is "color" and the color setting in the edit information 22 is "monochrome", the image editing unit 6 discards the color information included in the base image data 21 and generates monochrome preview image data. The generated preview image data is temporarily stored in the Random Access Memory (RAM) (not shown), etc.

Then, the controlling unit 7 controls the operation panel unit 4 to display a preview image of the saved-image information 31 specified by the user on the display device of the operation panel unit 4, based on the preview image data (step S14).

Namely, in the box preview in the present embodiment, upon previewing, reading conditions specified by the user when an image is read are applied to base image data 21. As such, since, upon previewing, a preview image to which reading conditions specified by the user are applied is displayed, the user is unaware of the fact that base image data 21 to which the reading conditions specified by the user are not applied is saved in the document box 11.

(3) Box Output

The box output process is the process of generating output image data from saved-image information 31 in the document box 11 and outputting the output image data. When the box output is selected by a user operation performed on the operation panel unit 4, a box output process is performed. The box output includes box printing, and/or box transmission, etc. In the box printing, the output destination is the printing unit 2 and thus a document image is printed based on output image data. In the box transmission, the output destination is the communicating unit 3 and thus output image data is transmitted to an external unit based on a predetermined communication protocol such as e-mail, an FTP (File Transfer Protocol), or facsimile transmission.

Figure 5:
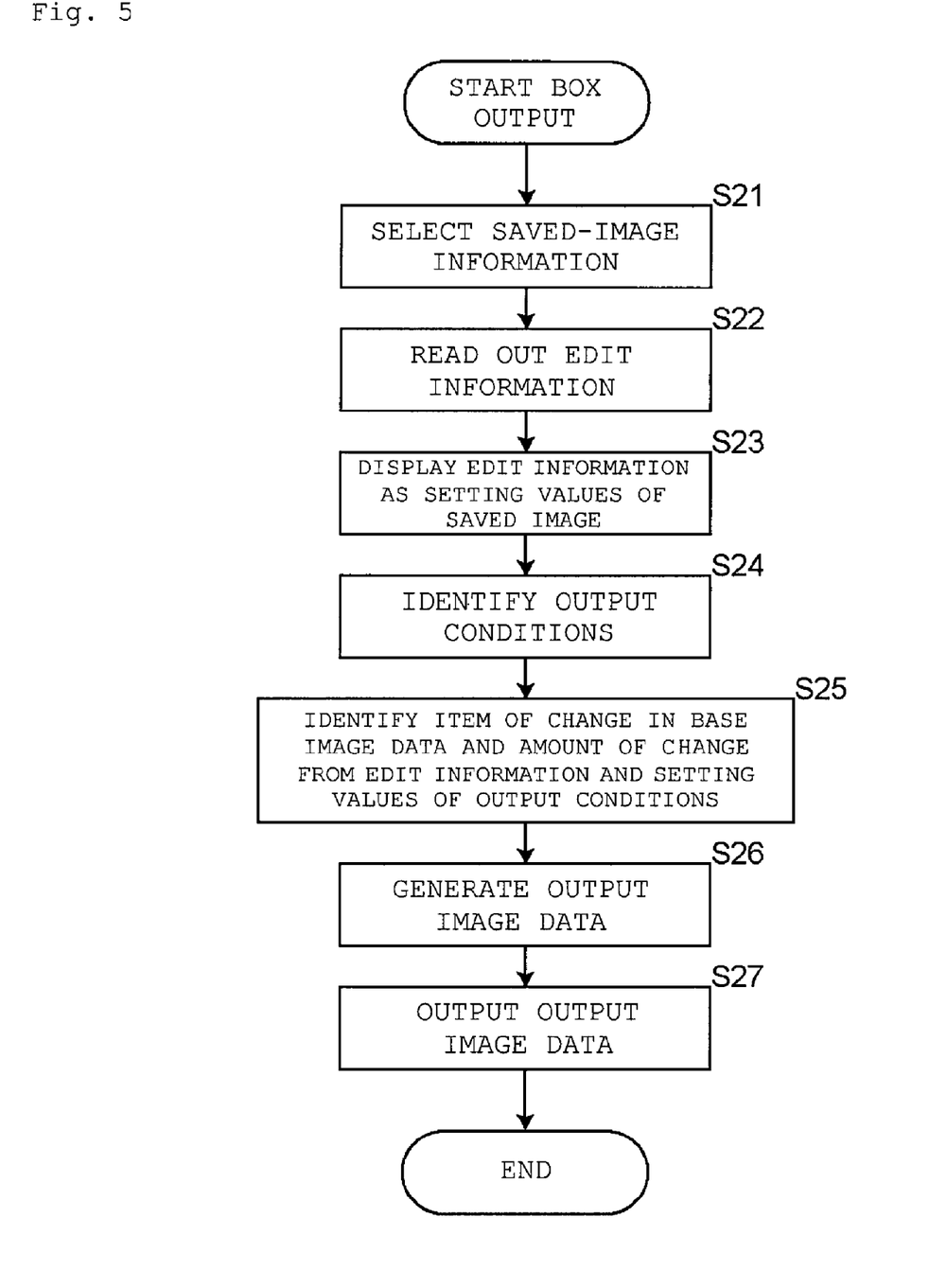
FIG. 5 shows a flowchart describing a box output process performed by the image forming apparatus shown in FIG. 1.

FIG. 5 is a flowchart describing a box output process performed by the image forming apparatus shown in FIG. 1. With reference to FIG. 5, the box output process will be described below.

In the box output, first, a list of pieces of saved-image information 31 in the document box 11 is displayed on the operation panel unit 4 and a piece of saved-image information 31 which is an output target is selected by a user operation performed on the operation panel unit 4. At that time, as a piece of saved-image information 31 in the list, a thumbnail image based on thumbnail image data 23, and edit information 22, etc., are displayed. The selection operation performed by the user is detected by the operation panel unit 4 and notified to the controlling unit 7. Then, the controlling unit 7 identifies a piece of saved-image information 31 which is the output target, based on the selection operation (step S21).

When the output target is identified, the controlling unit 7 reads out edit information 22 of the saved-image information 31 from the document box 11 and causes the operation panel unit 4 to display the edit information 22 (step S22).

In this case, output conditions are specified by the user. The output conditions include conditions such as color, resolution, and image quality. For example, a list of choices for each condition item is displayed on the display device of the operation panel unit 4 and from among the choices the user selects a desired value by operating the input device of the operation panel unit 4. This selection operation is detected by the operation panel unit 4 and notified to the controlling unit 7. Then, the controlling unit 7 identifies output condition settings specified by the user, based on the selection operation (step S24). The output condition settings are temporarily stored in the RAM (not shown), etc.

Then, the controlling unit 7 identifies a condition item(s) to be changed when output image data is generated from the base image data 21, and the amount(s) of change in the condition item(s) (hereinafter, referred to as output edit information) from the edit information 22 and the output condition settings (step S25). The output edit information is temporarily stored in the RAM (not shown), etc.

At this time, for a condition item whose absolute value is to be specified, a difference in value between the default reading conditions and the output condition settings is identified as the amount of change. For example, when the resolution in the default reading conditions is 600 dpi, the resolution in the reading condition settings (edit information 22) is 300 dpi, and the resolution in the output condition settings is 600 dpi, the resolution is not changed (i.e., the amount of change is zero). Alternatively, for example, when the color setting in the default reading conditions is color, the color setting in the reading condition settings (edit information 22) is color, and the color setting in the output condition settings is monochrome, the color setting is changed to monochrome.

Also, at this time, for a condition item whose relative value is to be specified, the amount of change is identified by combining a value in the edit information 22 and a value in the output condition settings. For example, when the enlargement/reduction setting in the default reading conditions is 100 percent, the enlargement/reduction setting in the reading condition settings (edit information 22) is 50 percent, and the enlargement/reduction setting in the output condition settings is 200 percent, the enlargement/reduction setting used when output image data is generated from the base image data 21 is 100 percent (=50 percent×200 percent). Therefore, enlargement/reduction is not performed when output image data is generated. Alternatively, for example, when the enlargement/reduction setting in the default reading conditions is 100 percent, the enlargement/reduction setting in the reading condition settings (edit information 22) is 50 percent, and the enlargement/reduction setting in the output condition settings is 100 percent, the enlargement/reduction setting used when output image data is generated from the base image data 21 is 50 percent (=50 percent×100 percent). Thus, a 50-percent reduction process is performed when output image data is generated. Note that in a reduction process new image data is generated by thinning out pixels of image data. Note also that in an enlargement process, new image data is generated by complementing and inserting pixels of image data.

When the controlling unit 7 identifies the output edit information in the above-described manner, the controlling unit 7 causes the image editing unit 6 to generate output image data (step S26). The image editing unit 6 generates output image data by applying the output edit information to the base image data 21. The output image data is temporarily stored in the RAM (not shown), etc.

Then, the controlling unit 7 outputs the generated output image data (step S27). At this time, in the case of box printing, the output image data is outputted to the printing unit 2 and the printing unit 2 prints a document image. Alternatively, in the case of box transmission, the output image data is outputted to the communicating unit 3 and the communicating unit 3 transmits the output image data to an external source.

Namely, in the box output in the present embodiment, upon outputting, output edit information taking into account reading conditions specified by the user when an image is read and output conditions is generated and the output edit information is applied to base image data 21. That is, the reading conditions and the output conditions are applied at a time upon outputting. As such, since image data to which reading conditions and output conditions are applied is outputted, the user is unaware of the fact that base image data 21 to which the reading conditions specified by the user are not applied is saved in the document box 11.

As described above, according to the above-described embodiment, the image reading unit 1 reads an image from a document to generate base image data 21 which matches default reading conditions. The controlling unit 7 identifies reading condition settings specified by the user in response to when the image is read. The information saving unit 5 saves the base image data 21 and the reading condition settings (edit information 22) in association with each other as saved-image information 31.

By this, since image data is saved in the default reading conditions, when performing an edit upon outputting, base image data 21 can be used that is not subjected to an edit for applying reading conditions to the image data. Accordingly, image degradation caused when the box function is used can be reduced.

In addition, according to the above-described embodiment, the image editing unit 6 generates preview image data by applying reading condition settings associated with base image data 21 saved in the information saving unit 5, to the base image data 21. The controlling unit 7 causes a predetermined display device to display a preview image based on the preview image data.

By this, even when base image data 21 is saved as a preview image which is presented before image data is outputted, an image based on image data to which the reading conditions are applied is displayed as versus an image based on the base image data 21. Hence, the user can appropriately set output conditions to the preview image.

According to the above-described embodiment, the controlling unit 7 identifies output condition settings upon image outputting specified by the user when base image data 21 saved in the information saving unit 5 is outputted. Also, the controlling unit 7 determines edit content(s) for the base image data 21 from reading condition settings associated with the base image data 21 and the output condition settings. Then, the image editing unit 6 edits the base image data 21 based on the determined edit content(s) to generate output image data. The controlling unit 7 outputs the output image data to the printing unit 2 or the communicating unit 3 according to the type of box output.

By this, since when image data is outputted an edit is performed at a time in conditions that take into account both reading conditions and output conditions, the number of edits is reduced, enabling a corresponding reduction of image degradation.

According to the above-described embodiment, when the controlling unit 7 causes a predetermined display device to display a list of one or a plurality of pieces of saved-image information 31 saved in the information saving unit 5, the controlling unit 7 causes the predetermined display device to display, for each piece of saved-image information 31, a thumbnail image generated by applying reading condition settings to the base image data of the saved-image information 31.

By this, since a list of thumbnail images that match reading conditions is displayed, even when base image data 21 is saved, the user can properly grasp and understand an image saving state.

Note that although the above-described embodiment is a preferred example of the present invention, the present invention is not limited thereto and various modifications and changes may be made thereto without departing from the spirit and scope of the present invention.

For example, in the above-described embodiment, thumbnail image data 23 may not be included in saved-image information 31.

Although in the above-described embodiment preview image data is generated upon carrying out the box preview process, preview image data may be generated in the same manner as thumbnail image data 23 and included in advance in saved-image information 31 and then used upon box preview. In such a case, the preview image data may be used as thumbnail image data 23.

In the above-described embodiment, the user may be allowed to change an image saved in the document box 11 (i.e., an image generated based on saved-image information 31). In such a case, a saved-image editing process such as that shown below is performed. For example, after a preview image is displayed, a changed condition setting(s) (for example, a color setting, and/or a resolution setting, etc.) is(are) inputted by the user. That input operation is detected by the operation panel unit 4 and notified to the controlling unit 7. The controlling unit 7 updates edit information 22 with that condition setting(s). Then, the image editing unit 6 regenerates preview image data using the updated edit information 22. The controlling unit 7 causes the display device of the operation panel unit 4 to display the preview image based on the regenerated preview image data. As such, in the saved-image editing process, an image saved in the document box 11 is edited. At that time, according to a setting change made by the user, edit information 22 is changed but base image data 21 is not changed. By doing so, regardless of how many times the saved-image editing process is performed before image data is outputted, since saved base image data 21 is not edited, the image data is edited only once when being outputted; accordingly, image degradation can be reduced as compared to the prior art.

In the above-described embodiment, in each condition setting, image trimming may be specified. In such a case, base image data 21 is not trimmed but trimming information (a trimming location and the amount of trimming) is included in edit information 22. Then, upon outputting and previewing, preview image data and output image data in which the trimming information is reflected are generated. In this case, for example, even when trimming is specified in the reading condition settings, by canceling trimming in the output condition settings image data of an original size can be outputted.

The present invention can be applied to an image forming apparatus that saves image data and outputs and manages the image data, e.g., a multi-function peripheral having a copy function, and a facsimile function, etc.

The present invention is summarized from each of the above-described embodiment as follows. Specifically, an image forming apparatus according to one embodiment of the present invention comprises an image reading unit that reads an image from a document to generate base image data which matches predetermined default reading conditions; a reading condition identifying unit that identifies reading condition settings specified by a user in response to when the image is read; and an information saving unit that saves the base image data and the reading condition settings identified by the reading condition identifying unit in association with each other as saved-image information.

By this, since image data is saved in the default reading conditions, when performing an edit upon outputting, image data can be used that is not subjected to an edit for applying reading conditions to the image data. Accordingly, image degradation caused when the box function is used can be reduced.

An image forming apparatus according to another embodiment of the present invention may be configured as follows, in addition to the above image forming apparatus. In this case, the image forming apparatus further comprises an image editing unit that generates preview image data by applying the reading condition settings associated with the base image data to the base image data saved in the information saving unit; and a controlling unit that causes a predetermined display device to display a preview image based on the preview image data generated by the image editing unit.

By this, even when base image data is saved as a preview image which is presented before image data is outputted, not an image based on the base image data but an image based on image data to which reading conditions are applied is displayed. Hence, the user can appropriately set output conditions to the preview image.

An image forming apparatus according to still another embodiment of the present invention may be configured as follows, in addition to any of the above-described image forming apparatuses. In this case, the image forming apparatus further comprises an output condition identifying unit that identifies output condition settings based upon image outputting specified by the user when the base image data saved in the information saving unit is outputted; an edit content determining unit that determines an edit content of the base image data from the reading condition settings associated with the base image data and the output condition settings identified by the output condition identifying unit; an image editing unit that edits the base image data based on the edit content determined by the edit content determining unit to generate output image data; and an outputting unit that outputs the output image data.

By this, since when image data is outputted an edit is performed at a time in conditions that take into account reading conditions and output conditions, image degradation can be reduced.

An image forming apparatus according to yet another embodiment of the present invention may be configured as follows, in addition to any of the above image forming apparatuses. In this case, the image forming apparatus further comprises a controlling unit that causes, when causing the predetermined display device to display a list of one or a plurality of pieces of saved-image information saved in the information saving unit, the predetermined display device to display, for each piece of saved-image information, a thumbnail image generated by applying the reading condition settings to base image data of the saved-image information.

By this, since a list of thumbnail images that match reading conditions is displayed, even when base image data is saved, the user can properly grasp an image saving state.

An image forming apparatus according to another embodiment of the present invention may be configured as follows, in addition to any of the above image forming apparatuses. In this case, the reading condition settings include at least one of a color setting, a resolution setting, and an image quality setting.

An image forming apparatus according to still another embodiment of the present invention may be configured as follows, in addition to any of the above image forming apparatuses. In this case, the image reading unit generates the base image data with color being specified for a color setting in the default reading conditions.

By this, even when reading conditions set by the user indicate monochrome, a color setting in output conditions can be set to color and thus color image data can be outputted.

An image forming apparatus according to yet another embodiment of the present invention may be configured as follows, in addition to any of the above image forming apparatuses. In this case, the image reading unit generates the base image data with a fixed standard resolution being for a resolution setting in the default reading conditions, regardless of a document size.

By this, even when reading conditions set by the user indicate a low resolution which is lower than the standard resolution, a resolution setting in output conditions can be set to high resolution and thus high-resolution image data can be outputted.

An image information saving method according to another embodiment of the present invention comprises a steps of:
generating base image data which matches predetermined default reading conditions, by reading an image from a document; identifying reading condition settings specified by a user in response to when the image is read; and saving the base image data and the reading condition settings identified by the reading condition identifying step in association with each other as saved-image information, in a predetermined recording medium.

By this, since image data is saved in the default reading conditions, when performing an edit upon outputting, image data can be used that is not subjected to an edit for applying reading conditions to the image data. Accordingly, image degradation caused when the box function is used can be reduced.

Having thus described in detail preferred embodiments of the present invention, it is to be understood that the invention defined by the foregoing paragraphs is not to be limited to any particular details and/or embodiments set forth in the above description, as many apparent variations thereof are possible without departing from the spirit or scope of the present invention.

What is claimed is:

1. An image forming apparatus comprising:
    an image reading unit that reads an image from a document to generate base image data which matches predetermined default reading conditions;
    a reading condition identifying unit that identifies reading condition settings specified by a user in response to when the image is read;
    an information saving unit that saves the base image data and the reading condition settings identified by the reading condition identifying unit in association with each other as saved-image information;
    an output condition identifying unit, after a preview image is displayed, that identifies output condition settings based upon image outputting specified by the user when the base image data saved in the information saving unit is outputted;

an edit content determining unit that determines an edit content of the base image data from the reading condition settings associated with the base image data and the output condition settings identified by the output condition identifying unit;

an image editing unit that generates preview image data by applying the reading condition settings associated with the base image data to the base image data saved in the information saving unit and edits the base image data based on the edit content determined by the edit content determining unit to generate output image data;

a controlling unit that causes a predetermined display device to display the preview image based on the preview image data generated by the image editing unit; and an outputting unit that outputs the output image data.

2. The image forming apparatus according to claim 1 further comprising:

a controlling unit that causes a predetermined display device to display, as a list of one or a plurality of pieces of saved-image information saved in the information saving unit, for each piece of saved-image information, a thumbnail image generated by applying the reading condition settings to base image data of the saved-image information.

3. The image forming apparatus according to claim 1, wherein the reading condition settings include at least one of a color setting, a resolution setting, and an image quality setting.

4. The image forming apparatus according to claim 3, wherein the image reading unit generates the base image data with color being specified for the color setting in the default reading conditions.

5. The image forming apparatus according to claim 3, wherein the image reading unit generates the base image data with a fixed standard resolution being specified for the resolution setting in the default reading conditions, regardless of a document size.

6. The image forming apparatus according to claim 1, wherein the edit content determining unit, for a condition item whose absolute value is to be specified, identifies a difference in value between the default reading conditions and the output condition settings as the amount of change.

7. The image forming apparatus according to claim 1, wherein the edit content determining unit, for a condition item whose relative value is to be specified, identifies the amount of change by combining a value in the reading condition settings and a value in the output condition settings.

8. An image information saving method comprising the steps of:

at an image forming apparatus:

generating base image data which matches predetermined default reading conditions, by reading an image from a document;

identifying reading condition settings specified by a user in response to when the image is read;

saving the base image data and the reading condition settings identified by the reading condition settings identifying step in association with each other as saved-image information, in a predetermined recording medium;

generating preview image data by applying the reading condition settings associated with the base image data to the base image data saved in the predetermined recording medium;

causing a predetermined display device to display a preview image based on the generated preview image data;

after the preview image is displayed, identifying output condition settings based upon image outputting specified by the user when the base image data saved in the predetermined recording medium is outputted;

determining an edit content of the base image data from the reading condition settings associated with the base image data and the output condition settings identified by the output condition identifying unit;

editing the base image data based on the edit content determined by the edit content determining unit to generate output image data; and an outputting unit that outputs the output image data.

* * * * *